Patented May 26, 1936

2,041,883

UNITED STATES PATENT OFFICE 2,041,883

APPARATUS FOR PRODUCING FUEL

James N. Vandegrift and Carl Postel, New York, and Carl V. Linn, Bay Shore, N. Y., assignors, by mesne assignments, to Coal Products Company of Delaware, Philadelphia, Pa., a corporation of Delaware Application March 5, 1931, Serial No. 520,269

14 Claims. (Cl. 202—114)

This invention relates to apparatus for producing fuel and relates especially to means for producing at low cost a fuel of high heat value from relatively cheap carbonaceous materials such as slack or waste from screened bituminous coking coals. It is particularly adapted to making a domestic lump fuel from bituminous coking coals or mixtures of same with non-coking fuels such as anthracite, lignite or other carbonaceous materials.

The improvements, features, and advantages of this invention relate particularly to the type of apparatus shown in application Serial No. 457,466, filed May 29, 1930, by Vandegrift and Postel for Method and apparatus for producing fuel wherein carbonaceous material is placed in a charging car, charged into a battery of preheating tubes in which the material is partially heated and dehydrated and is then discharged from the preheating tubes into a battery of vertical retort tubes where the material can be subjected to desired coking temperature, e. g. intermediate temperature distillation.

Features and purposes of this invention relate to improved means for charging and discharging a battery of retort tubes, for affording effectively vapor sealed removable closures for a battery of retort tubes and to improvements in operating mechanisms which afford not only a highly efficient apparatus but also one which may be readily used for mass production.

It is one of the features of this invention that a hood is provided over the battery of retort tubes which when placed in position over the battery is sealed except for a vapor outlet by a vapor seal of molten metal or other suitable material. Means are also provided for protecting, for example, a molten metal vapor seal from contamination with dirt, coke, coal, etc., as by a cover which permits a hood to be placed in vapor seal relation with the battery of retort tubes but which automatically covers the molten metal when the hood is removed. A pressure release valve, preferably comprising molten metal may be provided to prevent molten metal of the vapor seal from being blown out by sudden fluctuations in pressure. Moreover, the covering means for the molten metal seal may also be constructed so as to prevent the molten metal of the vapor seal from being blown out by generation of excessive vapor pressures.

It is a further feature of this invention that where a hood is used over the top of a battery of retort tubes as shown in application Serial No. 457,466, improved means for raising the hood out of vapor seal relation with the battery of retort tubes are provided. In this connection also improved means are shown for moving the hood out of the way after it has been elevated and for moving a battery of preheating tubes charged with preheated material into position over a battery of retort tubes so that material in the preheating tubes may be discharged into the retort tubes.

In order to prevent the material in the retort tubes from expanding and rising out of the tubes, pistons are provided which keep the coking material compressed but which permit the escape of gases generated in the retort tubes through an annular space around the edge thereof. While such a structure has been shown in application Ser. No. 457,466 above mentioned it is to be noted in that application that all of the pistons comprise piston rods which pass through the top of the hood. Such a construction is disadvantageous because vapor tight packings are required for all of the relatively numerous piston rods and this is not only expensive in the first instance but also increases liability of vapor leaks developing and necessity for extensive replacement of packing material. According to the structure of this invention, each of the piston rods, instead of passing through the hood, is attached to a plate or other carrying means within the hood. By such construction it is necessary to pass only the means for actuating the carrying means through the hood. For example, the carrying means for all of the pistons may be actuated by four rods passing through the hood. Such a construction decreases initial cost and decreases the maintenance expense of the apparatus and makes the hood relatively more vapor tight.

It is a further feature of this invention that the lower ends of retort tubes arranged in a battery are effectively sealed during coking operation to prevent escape of vapors therefrom. The lower ends of the retort tubes may be welded to a perforated plate so that there will be a vapor tight seal between the tubes and the furnace combustion chamber. The lower ends of the tubes may be closed by a removable closure, such as a closing plate, which when placed in position may be in vapor seal relation with the battery of retort tubes by a seal of molten metal or other suitable material. Improved means are afforded for removing the closing plate to permit removal of the coked material from the retort tubes and replacing it again in vapor seal relation. Moreover, means are provided for covering the molten metal vapor seal when the closing plate is removed to protect it from contamination by dirt, coke, coal, etc.

With regard to heating the retort tubes, there are certain improvements in the type and arrangement of gas burners which we prefer to use. According to this invention substantially parallel pairs of pipes for gas and air respectively are passed through the furnace chamber between the retort tubes at a plurality of levels, the whole comprising a novel and useful arrangement of burners and retort tubes. By apertures in adjacent gas and air pipes, jets of gas and air are made to impinge upon each other to form the individual flames used in the furnace.

It is a further feature of this invention that a charging car is employed which insures that material therein contained will be discharged uniformly as into a battery of preheater tubes. Thus instead of having a charging car with a single pair of dumping doors in the bottom thereof, the charging car of this invention is provided with a plurality of doors opening from the bottom thereof. For example, there may be provided a door running lengthwise the car for each row of preheater tubes contained in the preheater tube battery. All of the doors may be connected by a series of cranks and links so that they will open and close simultaneously. Moreover, according to this invention, means are provided for automatically releasing the dumping doors upon the charging car coming into position as over a battery of preheater tubes and for automatically closing them again upon running the charging car back into position for reception of another charge of coal.

As the furnace gases are withdrawn from the retort furnace and passed to the preheater tubes, they are mixed with air by novel means which at once lets in air and, as the opening for air is enlarged, increases the current of air thereby so that greater quantities of air will be introduced.

Further features of this invention relate to novel methods of moving the charging car between the source of supply and its position for discharge into preheater tubes. Novel means are provided for moving the preheater tubes from normal position to position over the retort tubes for charging the latter with preheated material and means are also provided for moving the hood out of the way by the same movement. It is an advantage of this invention that movements of the charging car, the preheater tubes, the hood, the closing plate for the bottom of the retort tubes, can all be actuated, if desired, from a single shaft driven by a single source of power.

Other purposes, novel features, and advantages of this invention will become apparent in connection with the following description of a specific embodiment of this invention illustrative thereof in reference to the accompanying drawings, wherein.

Apparatus embodying this invention may be supported on any suitable frame 20. The walls 21 of the retort furnace 25 may be supported as by horizontal supporting bars 23 secured to steel posts 22.

Within the retort furnace 25 are disposed a plurality of vertical retort tubes 24 which are preferably somewhat tapered, having a larger diameter at the bottom than at the top. For example, the diameter of tubes 24 at the top thereof may be about 4 inches and about 5 inches at the bottom. Retort tubes 24 are preferably of alloy steel that resists oxidation and the action of sulphur or of corrosive gases or vapors which may be generated in tubes 24 by distillation of material therein. A chrome steel is preferable for the purpose. The retort tubes 24 are in the form of castings about one-half inch in thickness. On the top of the retort tubes 172 funnels are mounted and secured thereto as by welding. The edges of funnels 172 may be welded together so as to produce a vapor tight jointure between the tubes 24 and so that furnace gases will be prevented from escaping into tubes 24 or the space above the upper ends thereof. In order to support the battery of retort tubes, suspension bars 26 may be used which run underneath the welded jointure between the edges of funnels 172 and which can be supported at their ends by steel beams framed into the columns 22. Preferably tubes 24 adjacent the tops thereof are also welded to perforated plate 173 in order to form a vapor seal between the tubes and the furnace chamber and in such case it is not essential that the weldings between the edges of funnels 172 be vapor tight.

Around the top of the battery of retort tubes and welded in vapor tight relation thereto is trough 27 which may be partially filled with some metal 28 such as lead which is fusible at temperatures maintained in the retort and which under normal conditions of use will be in a molten state.

In order to collect and control the escape of vapors generated in retort tubes 24, a hood 29 is provided over the top thereof which is adapted to be removed from position and moved out of the way to permit charging of the retort tubes as will be described hereinbelow. Hood 29 is preferably made of sheet steel with a refractory and heat insulating material 30 covering same in order to prevent condensation of vapors on the inner surface thereof. When the hood 29 is placed in position over the top of retort tubes 24, flanges 31, forming a part of the sides thereof, dip into the molten metal 28 in trough 27 and form a vapor seal therewith so that vapors collected in the hood are effectively prevented from escaping to the outside air and are forced to pass by vapor line 32 into condensers 33 and 34 which comprise no part of this invention and are shown in greater detail in application Serial No. 457,466 above mentioned.

The means whereby the hood 29 may be elevated and moved out of position so as to permit retort tubes 24 to be charged, is as follows. Mounted on a cross bar 35 between the tops of posts 22 and on bar 166 is fixed a motor 36 which through chains 37 is capable of rotating shafts 38. Mounted on each of shafts 38 are two worm gears 39 which mesh with two worm wheels 40 and rotate the latter in opposite directions. Bearings 42 attached to cross bars 41 between posts 22 support shafts 38. Brackets 43 also affixed to cross bars 41 support shafts 44 on which worm wheels 40 are mounted. Attached to each of the four shafts 44 are cranks 45 having rollers 46 at the outer ends thereof. Channel bars fit over rollers 46, forming a pair of tracks 47 which are movable with respect to said rollers. Between tracks 47 are bars 48 from which are dependent rods 49. The hood 29 is penetrated by rods 49 above referred to through stuffing boxes 50 in the top thereof. Within hood 29 rods 49 are affixed to transverse members or bars 51.

It is apparent in connection with the above construction that upon operating motor 36 the pairs of cranks 45 driven by each of shafts 38 can be turned in opposite directions to each other so as to elevate rollers 46 on the ends thereof and thus elevate tracks 47 causing bars 51 to come into contact with the top of hood 29 and elevate hood 29 from the battery of retort tubes.

Upon cranks 45 attaining a substantially vertical position, tracks 47 will have attained their most elevated position. The tracks 47 and the hood suspended therefrom can then be readily moved one side by rolling the track off of rollers 46 onto roller wheels 52 carried by cross bars 53 between frame 20 and posts 22. In addition to the above method of elevating hood 29, features of this invention may also be employed where other methods of elevating hood 29 are used, such as hydraulic pressure or air pressure.

Figure 1:
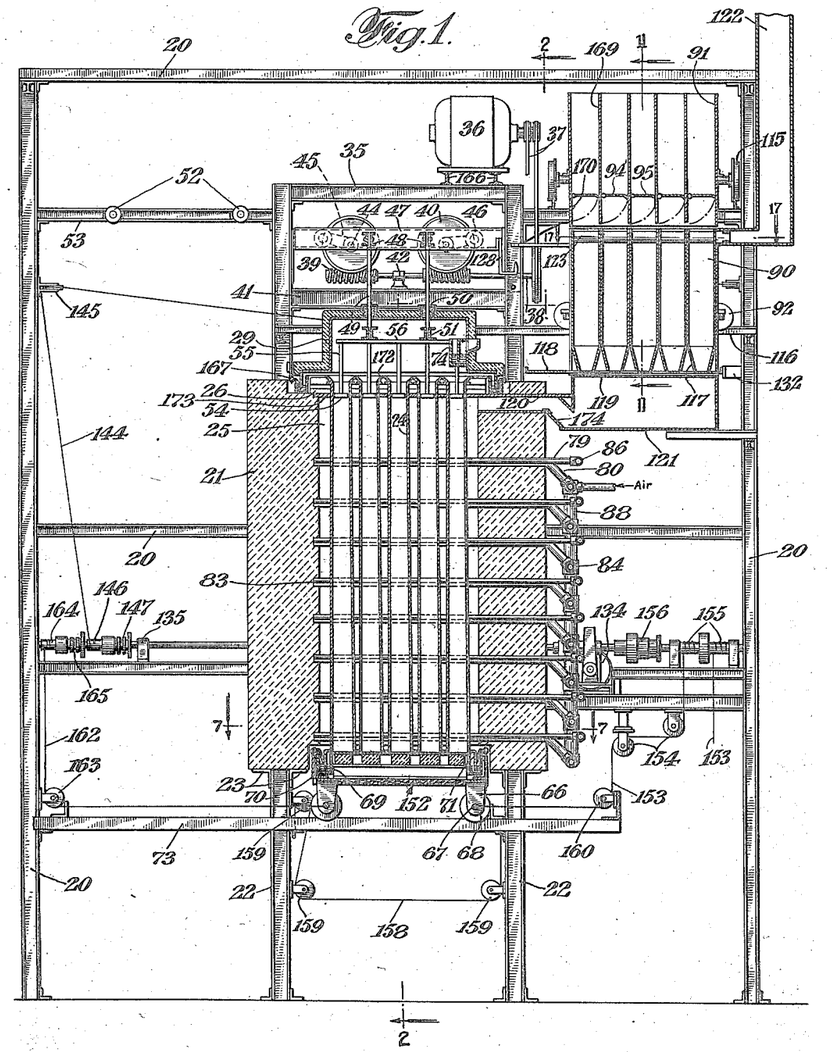
Fig. 1 is a sectional view in end elevation showing apparatus embodying this invention, the parts thereof being shown in the relative position which they assume during the coking operation.
Figure 2:
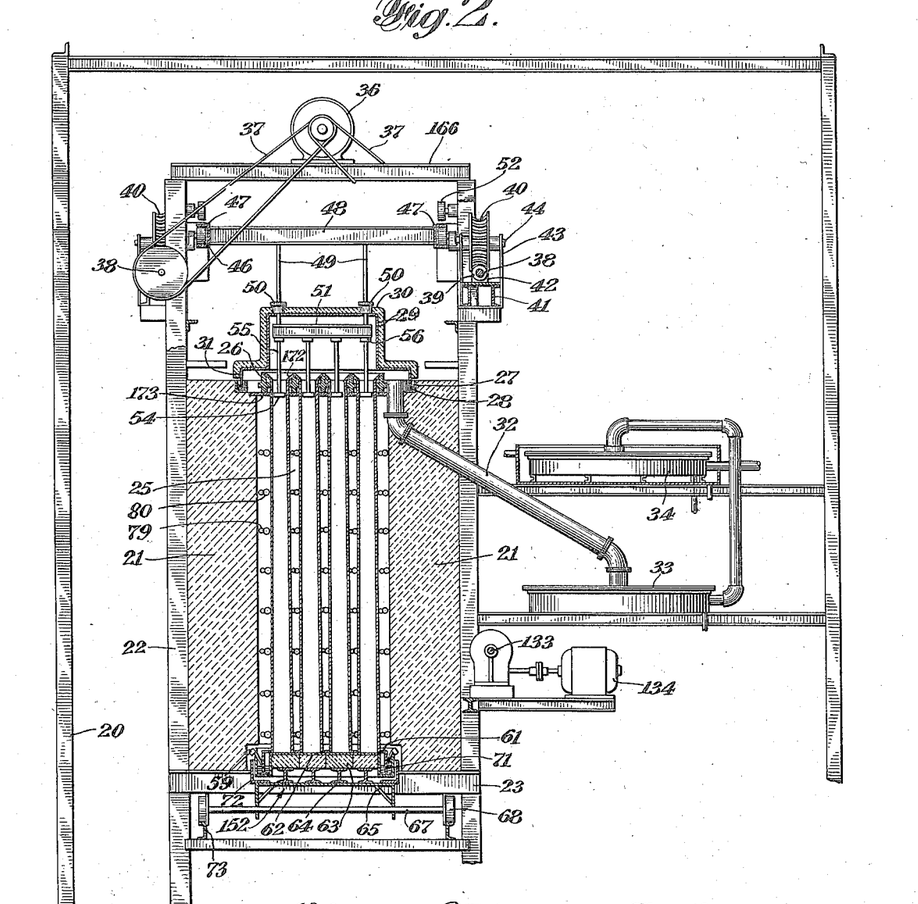
Fig. 2 is a front sectional view taken along the line 2—2 of Fig. 1.
Figure 8:
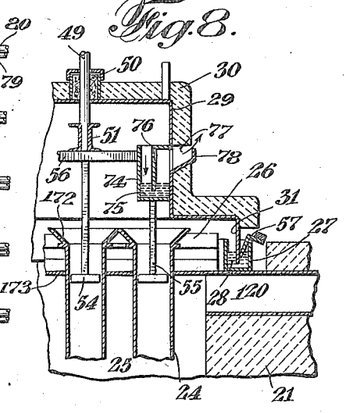
Fig. 8 is a sectional view showing detail of a portion of the hood including the molten metal vapor release valve.
Figure 9:
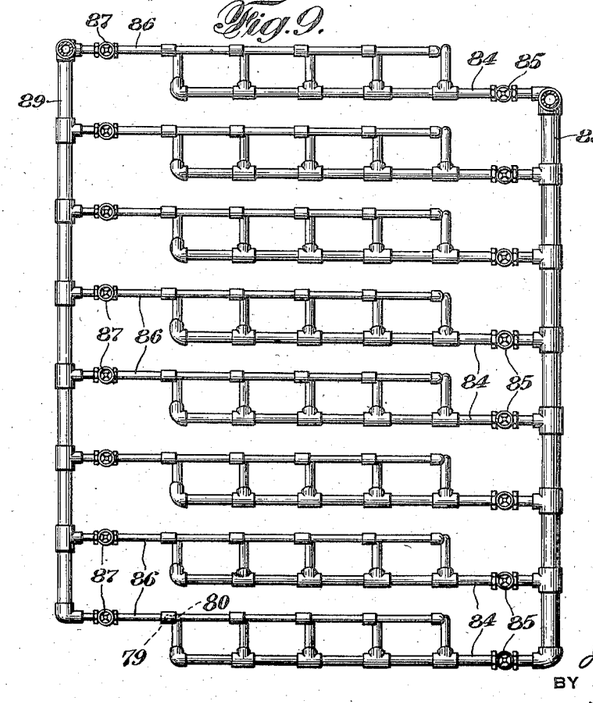
Fig. 9 is a detail view of the air and gas lines and valve arrangement therefor.

Near the top of retort tubes 24 plungers or pistons are placed which are in the form of disks 54 mounted on the ends of rods 55 affixed at their upper ends to bars 56 carried by bars 51. The arrangement of bars 51 and cross bars 56 holding the rods 55 comprise a simple transverse mounting means for the pistons. The disks 54 preferably fit somewhat loosely in the upper portion of retort tubes 24 leaving a small annular space between them and the tubes for the escape of gases generated in tubes. Disks 54 serve the additional purpose of preventing the coking material in tubes 24 from swelling and expanding and serve to keep the material compressed into a firm, dense and close grained mass having excellent characteristics for domestic fuel as described in application Serial No. 457,466. During the normal coking operation it is desirable to have the disks 54 extend slightly into the tubes. In this position disks 54 extend slightly lower than the lower edges of flanges 31 of hood 29. Consequently, after the hood has been lowered into place, it is usually desirable to lower tracks 47 a small additional amount so that disks 54 will be inserted into the tops of tubes 24 as shown in Figs. 1, 2 and 8 leaving a small distance between the top of hood 29 and bars 51.

Disks 54 serve the further purpose of providing means for dislodging material which has been treated in tubes 24. This may be accomplished by causing them to be depressed slightly to the position shown in Fig. 3. To this end the cranks 45 may be turned so as to lower tracks 47 and to push rods 49 down through the top of hood 29, thus depressing bars 51 and 56 and also the rods 55 and disks 54 mounted thereon.

The lower ends of retort tubes 24 may be welded to a plate 61 so as to form a vapor seal between the tubes and the combustion chamber 25 leaving the lower ends of the tubes open to permit the discharge of treated material therefrom. The lower ends of tubes 24 may be closed by a closing plate 62 supported on blocks of refractory material 63 which in turn may be carried by a plurality of bars 64. The ends of bars 64 may be carried on steel plates 65 having bearing members 66 affixed thereto in which rods 67 carrying wheels 68 are free to rotate, the whole comprising a car 152.

The plate 62 is provided around the edges thereof with a trough 69 adapted to contain molten metal 70. Around the edges of plate 61 are flanges 71 which are adapted to dip into molten metal 70 in trough 69 when plate 62 is raised so as to be in contact with the bottom of tubes 24 thus supporting the material treated in the tubes 24 and forming a vapor seal between the battery of retort tubes 24 and the surrounding atmosphere. The trough 69 may be shielded by shields 72 to prevent molten metal 70 from being cooled excessively or to such an extent that it would solidify.

Figure 5:
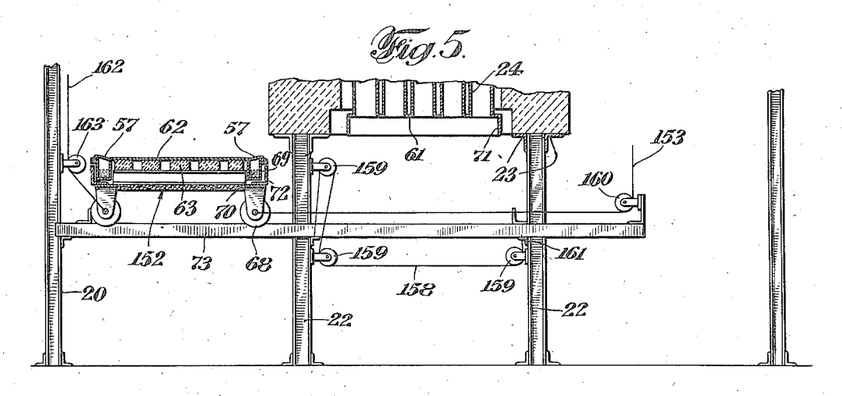
Fig. 5 is an end sectional view of the lower portion of the apparatus showing the closing plate for the bottoms of the retort tubes lowered and moved to one side so as to permit the coke in the retort tubes to be removed.
Figure 6:
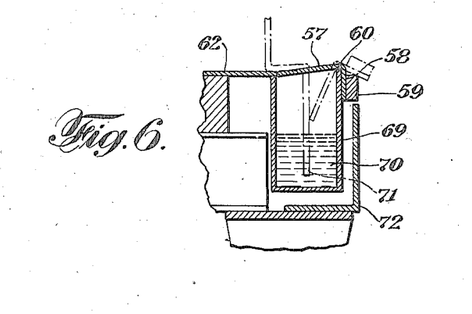
Fig. 6 is a sectional view in detail of the molten metal sealing means used in connection with the closing plate for the bottom of the retort and of the cover therefor.

In order to permit the discharge of material from tubes 24, the plate 62 may be lowered and moved out of the way. Wheels 68 on which the closing plate 62 is mounted are adapted to operate on tracks 73 which are capable of being raised and lowered by means hereafter to be described. Upon lowering the track the car comprising plate 62 can be brought clear of the lower portions of the battery of retort tubes and may then be rolled to one side to the position shown in Fig. 5.

In order to prevent dirt, coke or other foreign material from falling into molten metal 70 in vapor sealing trough 69 when the plate 62 is lowered and moved out of position, trough 69 is provided with covers 57 which automatically cover the trough 27 upon the removal of the flanges 71 therefrom. The covers 57 with extension 58 and the counter-weights 59 thereon are pivoted at the edge 60 of trough 69 so that when flange 71 is moved into the trough, cover 57 is depressed, permitting the flange to be inserted. When the flange is removed the cover pivots at edge 60 under the action of counter-weight 59 and comes to rest in closed position, the extension 58 of the cover having come into contact with the side wall of trough 69. Cover 57 not only provides means for keeping dirt and other foreign matter out of the molten metal when the plate 62 is lowered but also affords protection against the splashing of molten metal 70 out of trough 69 in the event of sudden increase of vapor pressure in the retort tubes.

By similar means the portions of sealing trough 27 which are perpendicular to the direction of travel of the hood 29 may be provided with counterweighted covers 167. The portions of trough 27 which are on the sides of the retort tube battery that are parallel to the line of travel of the hood and the top of vapor outlet 32, may be covered upon moving the hood to one side by means of plates 168 attached to the battery of preheating tubes 90 which is adapted to move into place over the battery of retort tubes upon the hood being moved away therefrom as will be hereinafter described.

For normal coking operation it is usually desirable to maintain molten metal 70 in trough 69 at a depth sufficient to withstand a pressure of about two and one half pounds per square inch. The molten metal 28 in trough 27 may be maintained at a depth sufficient to withstand a pressure of about one and one half pounds per square inch.

In order to prevent sudden pressure fluctuations from blowing vapor through the molten metal in either of troughs 27 or 69 and splashing the molten metal about, it is advantageous to employ a safety valve arrangement which permits escape of vapors at a pressure lower than that required for blowing vapor through the molten metal in either of troughs 27 or 69. A suitable form of pressure releasing means may be provided in connection with hood 29 by making a portion of the metal lining of the hood into a small container 74 adapted to hold molten metal 75 as is shown in detail in Fig. 8. By means of baffle plate 76 extending into the molten metal 75, the vapor collected in hood 29 may be caused to bubble through the molten metal 75 and pass out of the hood through an opening 77 therein. The pressure at which the vapors will be released may be regulated by the depth of the metal 75 maintained in the container 74 and may be for example about one pound per square inch under the conditions above specified. In order that the splashing of the molten metal of the pressure release valve may not cause losses of metal, a drain 78 may be provided on which the splashing metal may collect and which is adapted to return the metal into container 74.

Figure 7:
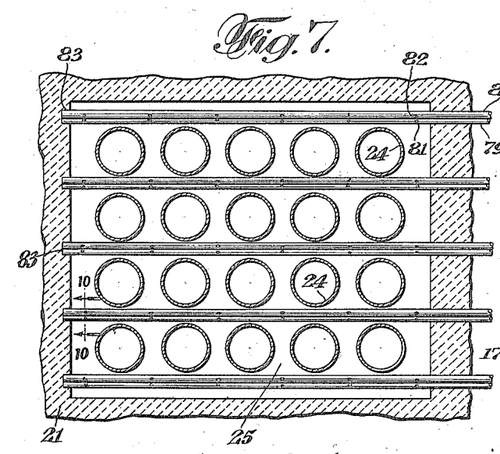
Fig. 7 is a plan view along the line 7—7 of Fig. 1.
Figure 10:
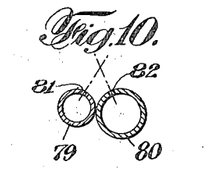
Fig. 10 is a detail view taken along the line 10—10 of Fig. 7 of a pair of gas and air tubes and apertures in said tubes providing an air-gas burner.
Figure 11:
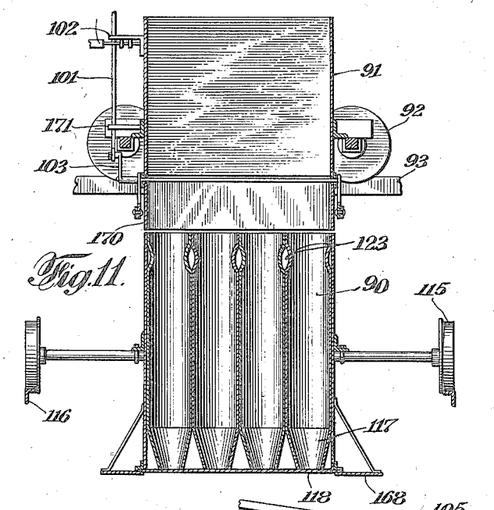
Fig. 11 is a sectional view of the charging car and preheater tube battery taken on the line 11—11 of Fig. 1.
Figures 12, 14, 15, 16:
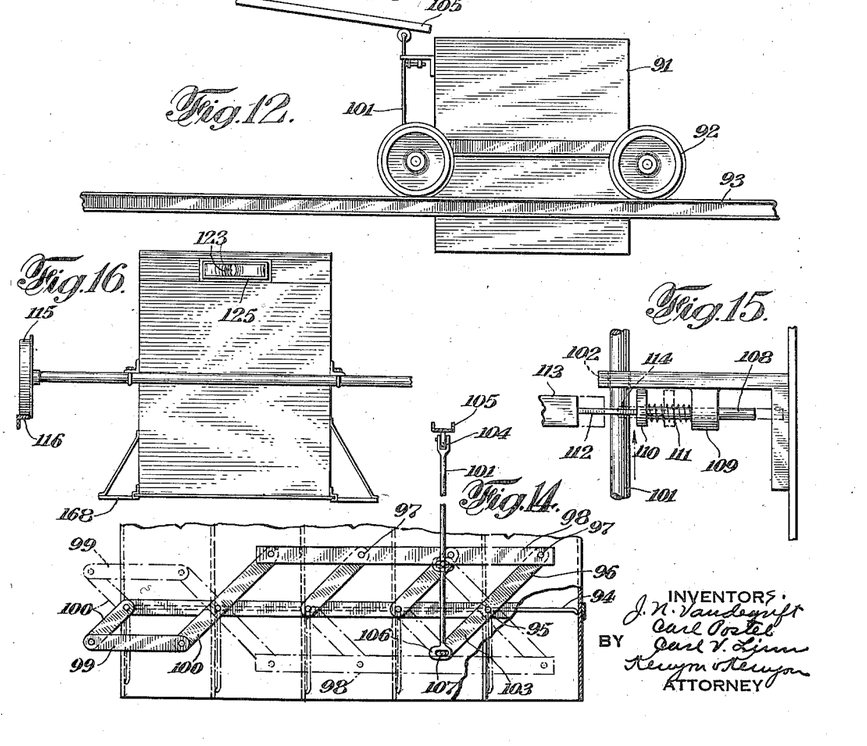
Fig. 12 is a side view of the charging car showing automatic means for closing the dumping doors.
Fig. 14 is a detail view of the means for simultaneously opening and closing the dumping doors of the charging car.
Fig. 15 is a detail view of the automatic lock and release thereof for the dumping doors of the charging car.
Fig. 16 is a view in elevation of the flue end of the preheating tube battery.
Figure 13:
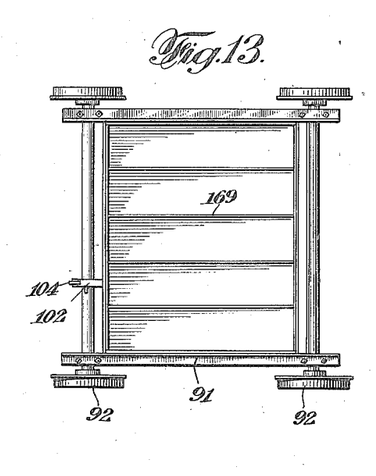
Fig. 13 is a plan view of the charging car.

In order to heat furnace 25 containing retort tubes 24, a plurality of burners are provided which consist of gas pipes 79 and air pipes 80 extending across the furnace chamber 25 between the retort tubes. The air and gas pipes are preferably arranged in welded pairs so that holes 81 in gas pipes 79 and holes 82 in air pipes 80 may be adapted to respectively discharge jets of gas and air which impinge upon one another above the pipes in proper proportion to support combustion. The separate burners are preferably situated in flues formed by each group of four retort tubes 24 as shown in Fig. 7. The detail of a separate burner is shown in Fig. 10. The pairs of air and gas pipes are supported by extending them through holes in one of the furnace walls 21 and across the furnace 25 into notches 83 in the opposite furnace wall 21. The burner pipes 79 and 80 are preferably arranged at a plurality of levels in furnace 25. At each of the levels the air may be supplied to air lines 80 by headers 84 controlled by valves 85. The gas at each of the levels may be supplied to gas pipes 79 by gas headers 86 controlled by valves 87. Riser 88 may supply headers 84 with air and riser 89 may supply headers 86 with gas. The volume of air and the gas for each level may be controlled as desired by valves 85 and 87 and the temperatures in furnace 24 thus regulated. Automatic regulation of temperature may be had if desired by thermostatic control of valves 85 and 87. It will be understood that this regulation of volume in the various headers is auxiliary to the controlled gas and air pressure which is uniform in the risers 88 and 89.

The material to be treated in retort tubes 24 is supplied thereto from a battery of preheater tubes 90 which are in turn charged with material by means of charging car 91. The detail structure of charging car 91 and battery of preheating tubes 90 and the movements thereof follow.

The charging car 91 may be of rectangular shape and mounted on wheels 92 which are adapted to roll on track 93. The charging car may be filled at any point where the material can be introduced therein and is then rolled over to the battery of preheating tubes where the material therein is permitted to fall by gravity into the preheating tubes. As the car moves back to position after having been filled, it may pass under a leveling bar which strikes off the material evenly and leaves in the car only the exact amount required to fill the preheater tubes. The charging car 91 is provided with a plurality of dumping doors 94 extending the length thereof and hinged on hinges 95 which are here shown as parallel to the movement of the car along track 93. The number of doors in the bottom of charging car 91 preferably corresponds to the number of rows of preheating tubes 90 in the preheating tube battery. Each of the doors 94 is positioned so that a row of preheating tubes will be immediately underneath the doors and so that the material in the charging car is permitted to discharge by gravity upon the opening of the doors into rows of preheating tubes immediately below. With each of hinges 95 partitions 169 are preferably provided so that each of the rows of preheater tubes under the doors 94 will receive an equal amount of material. Charging car 91 is provided with a skirt 170 which levels off material in the preheater tubes as the charging car is moved away.

All of the doors 94 are made to operate simultaneously by having affixed thereto a plurality of cranks 96, the ends of which are attached by pins 97 to a bar 98. For purposes of affording clearance the bar 98 need not extend the full length of car 91 but may have a complementary bar 99 affixed to cranks 100 which may extend in an opposite direction relative to cranks 96. The doors 94 may be automatically closed upon rolling car 91 away from the preheating tubes 90 to receive a fresh charge of material by means of a rod 101 which passes through bushings 102 and 171 and is hinged to a crank 103 attached to one of the doors. In order to permit rotation of crank 103 about hinge 95, a slot 106 is provided at the end of rod 101 in which pin 107, held in the end of crank 103, is permitted to have a certain amount of play. A roller 104 is placed at the top of rod 101 and cooperates with an inclined track 105 which causes the rod 101 to be depressed as the car rolls into position to receive coal. The rod and track 105 may be adjusted so that when the car has reached its position to receive coal the depression of rod 101 will be sufficient to completely close the interconnected doors 94.

When the rod 101 has been depressed sufficiently to close the doors 94, the doors 94 are locked in a closed position by pin 108 which is slidable in bushing 109 and which by means of stop 110 thereon and spring 111 is maintained resiliently in contact with rod 101 so as to cause pin 108 to be inserted into a notch 114 in rod 101, locking rod 101 and preventing it from again being elevated. Upon rolling the charging car 91 back into position over the preheating tubes, a pin 112 attached to stop 110 comes in contact with stop 113 attached to any fixed part of the apparatus, causing pin 108 to be removed from notch 114 in rod 101 and thereby permitting the weight of the material on doors 94 to cause them to open, discharging the material from the car and causing rod 101 to become elevated again.

The battery of preheating tubes may be supported between pairs of wheels 115 which are adapted to roll on track 116. The preheating tubes 90 in the preheating tube battery are provided with funnel-shaped lower ends 117 which facilitate the discharge of material contained therein into retort tubes 24. The preheating tubes 90 at the top thereof are shaped into square funnels, the edges of which may be welded together so as to form a vapor-seal between the edges of the funnels.

At the bottom of the preheating tube battery is a slidable plate 118 which has a plurality of openings 119 therein corresponding to the lower openings of funnels 117 and which may be moved so that openings 119 can be placed either in registering position with funnels 117 or out of registering position therewith. When out of registering position therewith the bottoms of preheating tubes 90 are closed and the openings 119 permit hot gases to rise around the outside of the preheating tubes in order that the material therein may be heated.

During the coking operation, the preheater tubes 90 are rolled out of registration with tubes 24 and are in the position shown in Fig. 1. In this position the bottoms of the preheater tubes are closed by plate 118 and hot gases from furnace 25 pass by pipe 120 to a chamber 121 below the battery of preheating tubes and rise from chamber 121 through opening 119 so as to heat and dehydrate the material in the preheating tubes. As the preheating tubes are preferably circular and are in contact with one another throughout the lower portions thereof, the upper portion of the preheating tubes may contain constricted portions 123 arranged so as to comprise a series of horizontal flues at the top of the preheating tube battery for carrying the hot gases horizontally to the collecting chamber 124 at the end of the car and out through stack 122. A neck 125 on collecting chamber 124 fits slidably into stack 122 thus permitting the battery of preheating tubes to be moved out of connection with stack 122 and returned thereto.

As the gases coming from furnace 25 are normally too hot to bring them directly into contact with the preheating tubes, the hot gases in pipe 120 are preferably mixed with air which serves to cool the gases and add to their volume. This is accomplished by regulating door or plate 174 which is hinged at 175 as is clearly shown in Fig. 4. The pipe 120 opposite to door 174 is brought sharply downward by wall 126. As the door 174 is opened to admit air it is apparent that the pipe 120 will be correspondingly constricted, thus causing the hot gases to have increased velocity and by a Venturi effect promote the suction of air through the opening closed by door 174 into chamber 121.

The battery of preheating tubes may be moved to position over the retort tubes 24 and automatically discharged into said tubes as follows. Means have been described for elevating hood 29 suspended from track 47 and for rolling the hood to one side. By attaching a hook 128 to tracks 47 and by attaching to the battery of preheating tubes a bracket 129 having a hole 130 therein adapted to receive hook 128 when hood 29 is elevated, hood 29 may be coupled with the battery of preheating tubes 90 so that when hood 29 is elevated and pulled out of position, the battery of preheating tubes 90 will be rolled on track 116 to position over the battery of retort tubes 24, and each of the preheating tubes 90 will be centered over a corresponding retort tube 24 as shown in Fig. 4.

Figure 4:
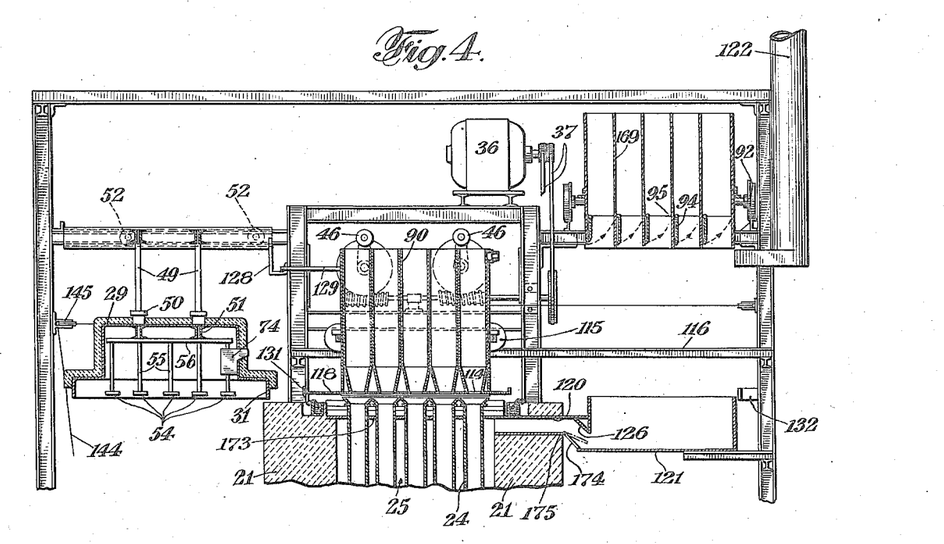
Fig. 4 is a side sectional view of the upper portion of the apparatus showing the hood removed and the preheater tubes in position for charging the retort tubes.

Upon the battery of preheating tubes 90 reaching the position shown in Fig. 4, the sliding plate 118 is made to come in contact with a stop 131 causing it to be moved into such position that holes 119 therein register with the bottoms of funnels 117 at the lower ends of preheating tubes 90. The material in preheating tubes 90 is thereupon permitted to fall by gravity into retort tubes 24. The battery of preheating tubes when pulled back from position over the retort tubes, will, by virtue of the coupling between it and the hood 29, also return the hood to position over the retort tubes so that it may be immediately lowered into vapor sealed position over the top of the battery of retort tubes. When the battery of preheating tubes is returned, the plate 118 strikes stop 132, thus moving holes 119 out of registration with the bottoms of funnels 117 and closing the lower ends of the preheating tubes so that additional material may be charged therein and preheated.

Figures 17, 18, 19:
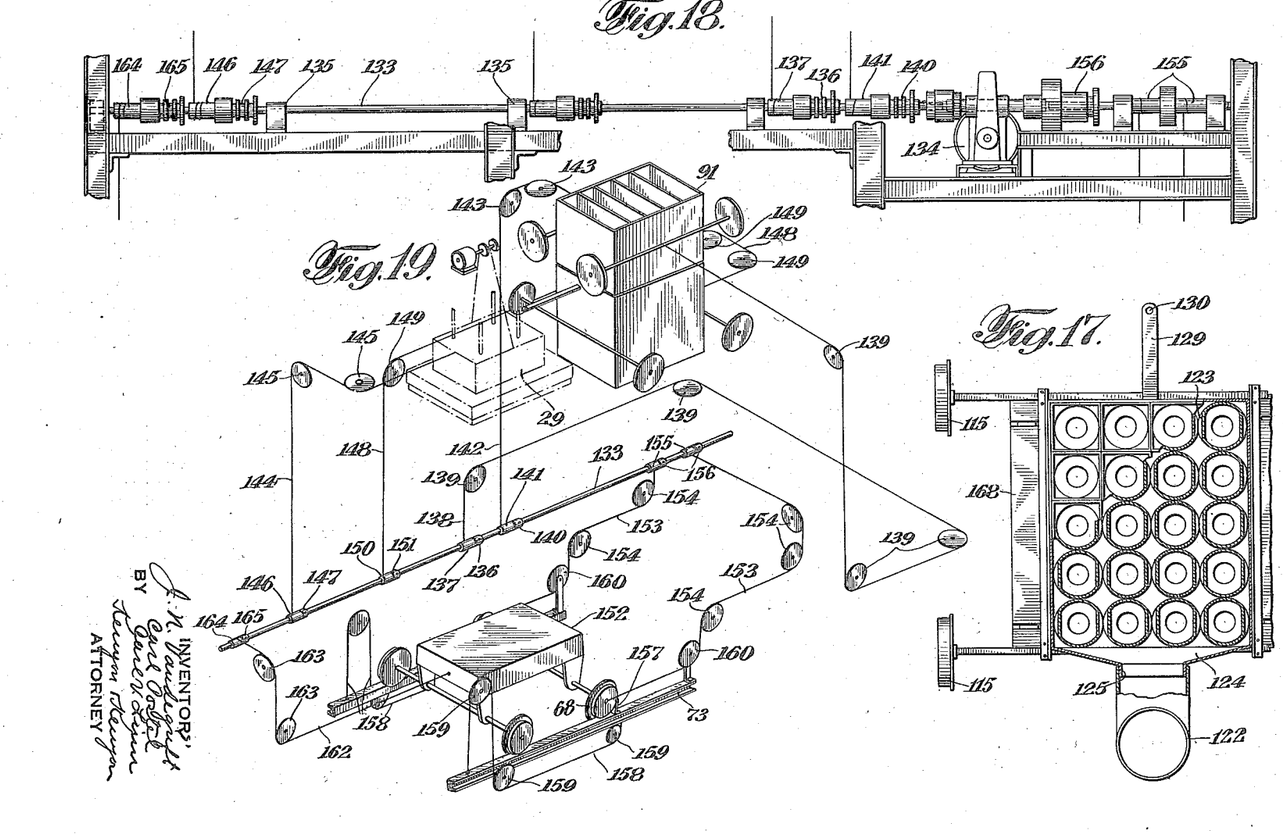
Fig. 17 is a plan view of the preheating tube battery taken along the line 17—17 of Fig. 1.
Fig. 18 is a detail elevation of the power shaft with clutches and drums therein for moving the various parts of the apparatus.
Fig. 19 is a largely diagrammatic view of the pulley and cord arrangements whereby the movement of the various parts of the apparatus may be effected.

The movements of the charging car 91, battery of preheating tubes 90 and also the raising and lowering of the closure for the bottom of the retort tubes and the moving of same to one side, may be operated and controlled from a single shaft 133 driven by any suitable source of power such as motor 134. Any number of suitable bearings 135 may be provided for maintaining shaft 133 in position. On shaft 133 there are mounted a series of clutches and drums upon which lines may be wound for moving the various parts by suitable pulley systems. The arrangement of clutches, drums, lines and pulleys is shown in Fig. 19.

The charging car, for example, may be moved into position for receiving a charge of coal by throwing in clutch 136 and causing drum 137 to rotate. Line 138 leading over pulleys 139 will then be wound upon drum 137 and cause the charging car to be drawn in the desired direction. The charging car may be returned to position over the battery of preheating tubes by throwing in clutch 140 so as to wind line 142 which passes over pulleys 143 upon drum 141 and cause the car to be pulled back. A line 144 passing over pulleys 145 is attached to hood 29 and may be wound upon drum 146 by throwing in clutch 147 for pulling the hood 29 away from the battery of retort tubes and for pulling the battery of preheating tubes which is coupled to the hood to position over the retort tubes. Line 148 passing over pulleys 149 is attached to the battery of preheating tubes and is adapted when wound upon drum 150, upon clutch 151 being engaged, to pull the battery of preheating tubes and the hood coupled therewith into the position shown in Fig. 1.

Track 73, upon which the car 152 is adapted to roll, is arranged so that one end thereof will slide up and down on one of the frames 20. The other end of track 73 is supported by two lines 153 which pass over pulleys 154 and 160 and which lead from a pair of drums 155 operated by a single clutch 156 on shaft 133. When lines 153 are wound on drums 155 the wheels 68 of car 152 will first be brought against stops 157 in track 73. Upon further winding an upward pull will be exerted upon pulleys 160 affixed to the end of track 73. A pair of lines 158 passing over pulleys 159 end and terminate in each of tracks 73 so as to cause track 73 to always remain in a horizontal position and when the lines 153 are wound on drums 155 the upward pull on pulleys 160 affixed to the end of track 73 causes the entire track 73 to be pulled upwardly while being maintained in a horizontal position. By releasing the tension in lines 153 the track 73 can be lowered in a substantially horizontal position until it strikes stops 161 fastened to posts 22 upon which the track then rests. When the track 73 and the closing car 152 have been thus lowered, the closing car can be pulled to one side by means of line 162 affixed thereto which passes over pulleys 163 and may be wound upon drum 164 when clutch 165 is engaged. The pulling of the closing car to one side will cause the lines 153 to unwind on drums 155. Upon rewinding lines 153 of drums 155 it is apparent that the closing car 152 will be first rolled along track 73 until the wheels 68 strike stops 157 and that further winding of the lines 153 on drums 155 will cause the track 73 and the closing car 152 thereon to be elevated so as to close the bottom of retort tubes 24.

While the operation of the above described apparatus is apparent, the following brief description will show and illustrate how waste coking coal fines may be treated so as to produce a lump domestic fuel of superior heating value and having other highly desirable characteristics. For convenience in description it may be arbitrarily assumed that a charge of the material in retort tubes 24 has been heated for a sufficient length of time to render it ready for removal therefrom and for cooling and dispensing in commercial form.

In order that the coked material in tubes 24 may be removed the closing plate 62 which closes the lower ends of retort tubes 24 is first lowered. This is accomplished by releasing the tension on lines 153, thus permitting the track 73 and the closing plate 62 carried thereon to be lowered sufficiently to clear the bottom of the furnace walls 21. Upon removal of the flanges 71 from the molten metal seal in trough 69, the counterweighted covers 57 automatically close sealing trough 69 and thus prevents dirt and coke from contaminating the molten metal contained in the trough. It will be understood, however, that a limited depth of coke fines or other material may be allowed to float on the surface of the molten metal to prevent oxidization. After the track 73 has been lowered clutch 165 may be brought into engagement rotating drum 164 and pulling line 162 so as to cause the closing plate 62 to be moved to one side and away from the bottom of the retort tubes 24 to the position shown in Fig. 5.

Figure 3:
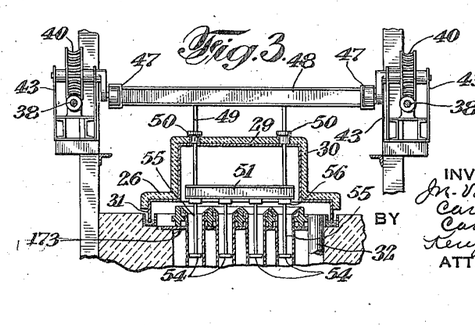
Fig. 3 is a sectional detail view showing the top of the retort tubes, hood and raising and lowering means, the parts being in position for ejection of coke from the retort tubes.

After the closing plate 62 has been lowered and moved to one side the material in tubes 24 can be forced out if necessary by operating motor 36 so as to lower tracks 47 and push disks 54 suspended therefrom a short distance into retort tubes 24 to the position shown in Fig. 3. This will cause the material contained in the retort tubes to be dislodged and render it free, due to the taper of retort tubes 24, to fall by gravity into a suitable collection chamber not shown. After the coked material has been removed, clutch 156 may be engaged causing drums 155 to rotate winding lines 153 thereon and pulling closing plate 162 along track 73 until wheels 68 strike stops 157. Upon further tension on line 153, the track 73 will be raised, thus raising the closing plate 62 so as to cover the lower ends of retort tubes 24 and to effect a vapor seal between the atmosphere, the combustion furnace and the battery of retort tubes.

Upon causing motor 36 to rotate and move cranks 45 through an additional 180°, the pistons 54 will be raised until the mounting means 56 therefor strikes the top of hood 29 and elevates the hood sufficiently to clear the top of the battery of retort tubes. When the cranks 45 have obtained a substantially vertical position the hood will be sufficiently elevated so that upon engaging clutch 157, the hood can be pulled by line 144 to one side, the track 47 rolling onto rollers 52.

During the period in which the material in tubes 24 is coked, the hot gases from the furnace pass through the battery of preheating tubes 99 and at the end of the coking period the material in preheating tubes 99 will have been dehydrated and brought to proper temperature for charging into the retort tubes. The material in preheater tubes 99 may be heated for example to about 350° F. and should preferably be kept below about 400° F. as at temperatures above about 400° F. the material begins to become objectionably plastic.

Since the elevation of the hood causes it to become coupled with the battery of preheating tubes, the pulling of the hood to one side also causes the battery of preheating tubes to be brought into position over the retort tubes and upon reaching the proper position the plate 118 is automatically moved so as to open the lower ends of the preheating tubes and permit the material contained therein to be charged into the retort tubes.

Immediately upon the fresh material striking the hot surfaces of the retort tubes gases and vapors begin to be generated therein. Consequently the battery of preheating tubes should be drawn away from the top of the retort battery as quickly as possible by engaging clutch 159 and pulling it back by means of line 148. As the battery of preheating tubes is coupled to the hood, the hood is also moved into position over the retort battery and may be quickly lowered to effect a vapor seal and bring plunger decks 54 to the top of coal in retort tubes 24.

The charging car 91 which has been drawn to one side for purposes of filling same with a measured quantity of coking material or a mixture of coking and non-coking material may then be rolled on track 93 by line 142 so as to bring it over the battery of preheating tubes where the dumping doors 94 are automatically released causing the material in the charging car to be dumped into the battery of preheating tubes. By engaging clutch 40 the charging car may then be drawn by means of line 139 back to position for receiving a further charge of material for the next succeeding operation. During the travel dumping doors 94 will have been automatically closed.

The battery of retort tubes having been freshly charged and the battery of preheating tubes also having been freshly charged, the coking may be permitted to continue until such time as the material in tubes 24 is ready to be removed therefrom at which time the cycle of operations above enumerated may be repeated.

As set forth in application Serial No. 457,466 it has been found desirable to coke the material in tubes 24 at intermediate temperature distillation, namely, about 1400° F. Since the diameter of the lower portion of retort tubes 24 is somewhat larger than the upper portions thereof it has been found desirable to maintain the temperature at the bottom of the furnace at about 1600° F. and the temperature at the upper portion of the furnace at about 1400° F.

With the apparatus above described the coking operation can be accomplished in about 80 minutes as against 12 to 24 hours where ordinary by-product coke ovens or other types of vertical retorts are used. Moreover, the operations of emptying the retort tubes 24, recharging them with fresh material and recharging the preheater tubes can be accomplished in less than one minute.

Since the time required for discharging coked material and recharging fresh material is reduced to less than one minute by the apparatus above described, there is a negligible loss of heat and of released vapors and for all practical purposes a substantially continuous process is afforded. At the same time heat and pressure may be applied to the plastic coking mass so as to produce a dense, close grained fuel structure of novel and desirable characteristics as described in application Serial No. 457,466 and the material is fractured in the process of retorting into desired domestic sizes—a result not obtainable by any other process either continuous or intermittent. The resulting product coked at the intermediate temperatures above mentioned, is a new domestic lump fuel of 35% to 50% greater heat value than anthracite which may be produced at the mine at only 40% of the cost of producing anthracite.

While this invention has been described in connection with specific embodiments thereof, it is to be understood that this has been for purposes of illustration merely and that the true scope of this invention is not limited thereby.

We claim:

1. Apparatus of the character described which comprises a vertical retort, a hood over the top of said retort adapted to seal the upper end of said retort from the air, said hood being suspended from a track, rollers mounted on cranks supporting said track, means for turning said cranks to elevate and lower said track, and rolling means adapted to cooperate with said track when in an elevated position and upon which said track and hood may be rolled to one side of the top of said retort.

2. In apparatus of the character described having a battery of vertical retort tubes, and a removable hood over the top of said battery of retort tubes adapted to seal the upper end of said tubes from the air, the combination comprising pistons in said retort tubes suspended from a track, means for elevating and lowering said track, means for moving said track to one side on rollers, means for elevating said hood when said track and pistons are elevated, means for lowering said hood into vapor seal relation with the top of said battery of retort tubes when said track is lowered, and means for pushing said pistons into said retort tubes upon further lowering said track after said hood has been placed in position over said retort tubes.

3. In apparatus of the character described having a battery of substantially vertically extending retort tubes and a hood over the top of said battery of retort tubes adapted to collect and conduct away evolved gases and vapors escaping from the upper ends of said retort tubes, the combination comprising stationary means for elevating said hood away from and lowering said hood into position for collecting evolved gases and vapors escaping from the tops of said retort tubes, a horizontally movable battery of preheating tubes, means for coupling said hood to said battery of preheating tubes when said hood is in elevated position, and means for moving said hood and said battery of preheater tubes horizontally with respect to said retort tube battery and to said stationary means for lowering and elevating said hood, to bring said battery of preheating tubes into position for charging material from said preheating tubes into said retort tubes.

4. In apparatus of the character described having a battery of substantially vertically extending retort tubes, a removable hood adapted to cover the upper end of said battery of retort tubes, means for lowering and elevating said hood and means for moving said hood horizontally and to one side of said battery of retort tubes, the combination comprising a hooking member attached to said hood, a horizontally movable battery of preheating tubes adapted to discharge the contents thereof into said retort tubes when in position over said battery of retort tubes, said retort tubes being fixed with respect to each other and said preheater tubes being fixed with respect to each other and adapted to register with said retort tubes for dumping material from the preheater tubes into the retort tubes, a complementary hooking member attached to said preheating tube battery, said hooking member and complementary hooking member being adapted to couple said hood to said preheating tube battery when said hood is elevated, and means for horizontally moving said hood and said preheating tube battery when said hood is elevated to bring said battery of preheating tubes into position for charging material from said preheating tubes into said retort tubes.

5. In apparatus of the character described having a substantially vertically extending retort tube, a hood over said retort tube forming a chamber closed except for an outlet adapted to collect evolved gases and vapors escaping from the tops of said retort tube and means to heat said retort tube, the combination comprising sealing means adapted to contain molten metal vapor seal material between said hood and said retort tube to prevent the escape of gases and vapors from said chamber to the surrounding atmosphere and a safety valve adapted to contain molten metal seal material mounted in said hood, said sealing means adapted to contain molten metal vapor seal material and said safety valve being adapted to be heated by said means for heating said retort to maintain metal seal material therein in a molten condition.

7. In apparatus of the character described having a retort and a removable closure for said retort, the combination with a trough that is adapted to hold liquid therein and that is carried by the part of said retort adapted to be closed by said closure and a flange forming part of said closure and adapted to be inserted and withdrawn from said trough when said closure and said retort are moved relatively to each other to bring said closure into and away from position for closing said retort, said flange being adapted to form with liquid in said trough a vapor tight seal between the part of said closure having said flange and said retort when said closure is in position for closing said retort, of covering means for said trough, and means for yieldingly mounting said covering means adjacent one edge of said trough to swing downwardly into said trough when said flange is inserted into said trough, said means for yieldingly mounting said covering means being adapted to return said cover to position across the top of said trough and for maintaining said covering means in said position when said flange is removed from said trough.

7. In apparatus of the character described having a vertical retort and a removable closure for the top of said retort, the combination with a trough that is adapted to hold liquid therein and that is carried by said retort adjacent the top thereof and a flange forming a part of said closure and adapted to be inserted and withdrawn from said trough when said closure and said retort are moved relatively to each other to bring said closure into and away from position for closing said retort, said flange being adapted to form with liquid in said trough a vapor tight seal between the part of said closure having said flange and said retort when said closure is in position for closing said retort, of covering means for said trough, and means for yieldingly mounting said covering means adjacent an outer edge portion of said trough to swing downwardly into said trough when said flange is inserted into said trough and being counterweighted to automatically swing said covering means to position across the top of said trough when said flange is removed from said trough and means for maintaining said covering means in position across the top of said trough to cover the contents thereof when said flange is removed from said trough.

8. In apparatus of the character described having a vertical retort and a removable closure for the top of said retort, the combination with a trough that is adapted to hold liquid therein and that is carried by said retort adjacent the top thereof and a flange forming a part of said closure and adapted to be inserted in and withdrawn from said trough when said closure and said retort are moved relatively to each other to bring said closure into and away from position for closing said retort, said flange being adapted to form with liquid in said trough a vapor tight seal between the part of said closure having said flange and said retort when said closure is in position for closing said retort, of guard plate means mounted on the outer side of said trough and means for maintaining said guard plate means substantially in contact with said flange when said flange is inserted in said trough and between said flange and said outer side of said trough to prevent liquid in said trough from splashing out of said trough.

9. In apparatus of the character described having a substantially vertically extending battery of retort tubes and a removable hood adapted to cover the upper end of said retort tube battery and to collect evolved gases and vapors escaping from the upper ends of said retort tubes, the combination with a sealing trough, adapted to maintain molten metal therein, adjacent the upper end of said battery of retort tubes and a flange on said hood adapted to be inserted into said trough to form a vapor seal between said retort tube battery and the part of said hood having said flange, of counterweighted covering means for the outer edge of said trough adapted to swing downwardly into said trough when said flange is inserted into said trough and to cover said trough automatically when said flange is removed from said trough.

10. In apparatus of the character described having a vertical retort tube, the combination comprising a hood for said retort tube adapted to seal the upper end of the retort tube from the air, said hood being suspended from a track, means for elevating and lowering said track, and rotary means for cooperating with said track when in elevated position for rolling to one side said track and said hood.

11. In apparatus of the character described having a retort and a closure for said retort, the combination comprising means for maintaining a vapor seal of molten metal for sealing said closure when said closure is in position for closing said retort, a safety valve adapted to contain molten metal, molten metal in said means adapted to make a vapor seal between said retort and closure and molten metal in said safety valve, the molten metal in said safety valve being displaceable to release vapors from said retort at a pressure which is substantially lower than the pressure required to force vapors through molten metal contained in said molten metal vapor seal.

12. In apparatus of the character described, the combination comprising a first member presenting a trough adapted to hold sealing material and having a rectilinear elongated edge, covering means for said trough comprising a cover, means adjacent an edge of said trough for mounting said cover to swing on an axis substantially parallel to said edge of said trough, means for yieldingly maintaining said cover in position across the top of said trough, a second member presenting a flange, said flange being adapted to be inserted into said trough to contact with sealing material in said trough and make a vapor seal between portions of said first and second members respectively presenting said trough and presenting said flange and to be withdrawn from said trough, said cover being adapted to be swung downwardly into said trough when said flange is inserted in said trough, and said means for yieldingly maintaining said cover in position being adapted to return said cover to position across the top of said trough when said flange is removed therefrom.

13. In apparatus of the character described, the combination with a vertical retort, a preheater adapted to be moved into and away from position over said retort for charging material into said retort, and a movable closure for the bottom of said retort adapted to be moved into and away from position for closing the bottom of said retort, of a rotatable shaft and means operable from said shaft for moving said closure into and away from position for closing the bottom of said retort and for moving said preheater into and away from position above said retort, said means being adapted to move said preheater over said retort when said closure is in position for closing the bottom of said retort.

14. In apparatus of the character described having a battery of vertical retort tubes, the combination comprising a hood adapted to cover the upper end of said battery of retort tubes, a plurality of pistons in said tubes attached to common mounting means therefor within said hood, and means fixed to said mounting means and passing through said hood in movable relation thereto which means is operatively connected to said pistons by virtue of said pistons being attached to said mounting means and which is adapted to move said pistons attached to said mounting means downwardly into retort tubes and to thereafter elevate said pistons out of said retort tubes.

JAMES N. VANDEGRIFT.
CARL POSTEL.
CARL V. LINN.